United States Patent [19]

Sawano et al.

[11] Patent Number: 4,855,917
[45] Date of Patent: Aug. 8, 1989

[54] ANTISKID CONTROL DEVICE

[75] Inventors: Susumu Sawano, Tokyo; Masaru Sakuma, Kawasaki; Hideaki Nagai, Yokohama; Tatsuya Funabashi, Tokyo, all of Japan

[73] Assignee: Tokico, Ltd., Japan

[21] Appl. No.: 54,659

[22] Filed: May 27, 1987

[30] Foreign Application Priority Data

May 30, 1986 [JP] Japan .................................. 61-125498
May 30, 1986 [JP] Japan .................................. 61-125499

[51] Int. Cl.⁴ ................................................ B60T 8/32
[52] U.S. Cl. .................................. 364/426.02; 303/95; 303/97; 303/103
[58] Field of Search .................... 364/426.02; 180/197; 303/95, 97, 103, 105

[56] References Cited

U.S. PATENT DOCUMENTS

| | | | |
|---|---|---|---|
| 4,384,330 | 5/1983 | Matsuda et al. | 303/97 |
| 4,392,202 | 7/1983 | Matsuda | 364/426 |
| 4,430,714 | 2/1984 | Matsuda et al. | 364/426 |
| 4,671,579 | 6/1987 | Sawano et al. | 303/97 |
| 4,693,522 | 9/1987 | Wupper et al. | 303/105 |
| 4,763,260 | 8/1988 | Sakuma et al. | 303/105 |

Primary Examiner—Gary Chin
Attorney, Agent, or Firm—Mason, Fenwick & Lawrence

[57] ABSTRACT

In an antiskid control device comprising detectors for measuring circumferential velocities of a plurality of wheels an actuator for operating a braking oil pressure for each of the wheels and an electric circuit for calculating friction coefficients on the road surfaces, to which the wheels are in contact, calculating aimed wheel circumferential velocities from the friction coefficients on the road surfaces and operating the actuator such that each of the aimed wheel circumferential velocities and each of the measured wheel circumferential velocities coincide with each other, the electrical circuit operates the actuator by setting individual aimed wheel circumferential velocities for the plurality of wheels from a vehicle deceleration calculated from an average value for the friction coefficients on the road surfaces with which a plurality of wheels are in contact, respectively, and the slip ratio for each of the plurality of wheels.

8 Claims, 8 Drawing Sheets

ANTISKID CONTROL DEVICE

BACKGROUND OF THE INVENTION

1. Field of the Invention

This invention concerns an antiskid control device for use in a vehicle braking apparatus.

An antiskid device is generally adapted to perform braking operation, upon detecting that a skid state has appeared in vehicle wheel by virtue of the braking operation, while conducting the operation of eliminating the skid state by temporarily moderating the braking force and conducting the operation of recovering the braking force after the elimination of the skid state, and suitable control depending on the slip ratio of wheels is required for the control of the antiskid device.

That is, assuming the vehicle body velocity as V and the circumferential velocity of a wheel as Vw, the slip ratio S of the vehicle is defined as :

$$S = \frac{V - Vw}{V} \tag{1}$$

Figure 6:
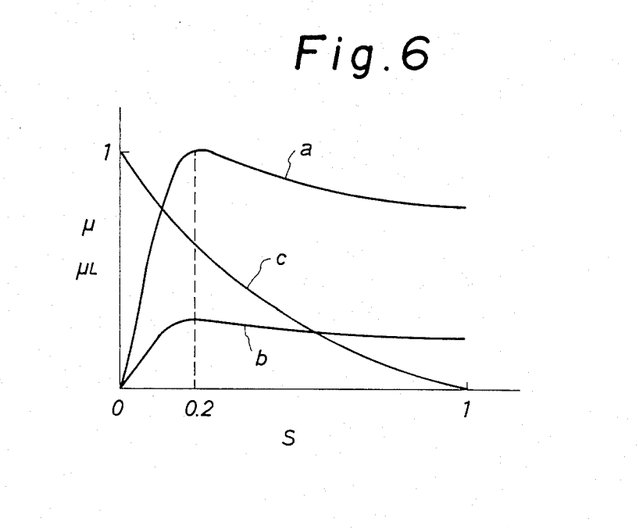
FIG. 6 is an explanatory view illustrating a relationship between the slip ratio and the frictional coefficient.

Further, assuming the friction coefficient between the wheel and the road surface in contact therewith and in the running direction as $\mu$, there is a relationship between the slip ratio S and the friction coefficient $\mu$ approximately as shown in FIG. 6.

In FIG. 6, curve a represents a relationship between the slip ratio S and the friction coefficient $\mu$ in a case where $\mu$ is high as on dried concrete road surface, curve b represents a relationship between the slip ratio S and the friction coefficient $\mu$ in a case where $\mu$ is as on snow-covered road surface and, further, curve c represents a relationship between the slip ratio S and the lateral friction coefficient $\mu L$ in the lateral direction of a wheel, that is, in the direction perpendicular to the running direction.

It can be seen from the figure that the friction coefficient $\mu$ is maximum near the slip ratio S32 0.2, which is decreased in the case where the wheels are locked, for example, by the rapid braking, the wheels assume a non-rotation state, and thereby the slip ratio S is increased, and the lateral friction coefficient $\mu L$ is rapidly lowered along with the increase of the slip ratio S.

Figure 2:
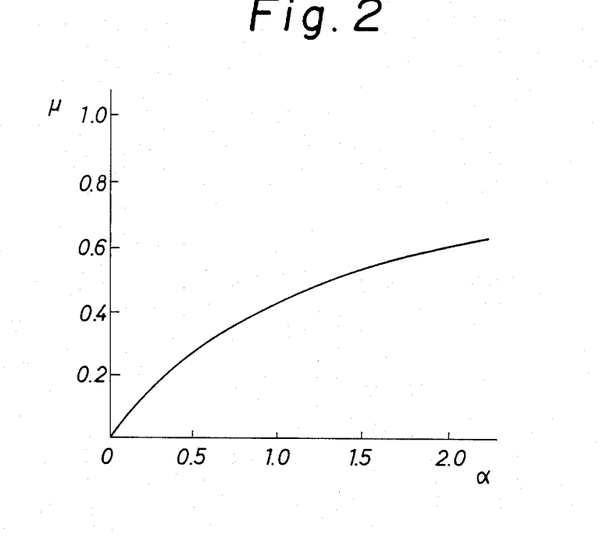
FIG. 2 is a graph illustrating a correlationship between the acceleration/deceleration ratio of a wheel and the road surface friction coefficient.

Accordingly, in order to stop a vehicle within a minimum distance, it is desirable to apply braking force to wheels such that the friction coefficient $\mu$ during braking is always at the maximum value (0.2 in the example of FIG. 2). Further, in the case where the friction coefficient $\mu$ in the running direction is highest, since the lateral friction coefficient $\mu L$ also takes a relatively high value, thereby preventing the lateral slip of a vehicle body, such application of braking force provides a merit that the vehicle can be stopped quite safely.

2. Description of the Related Art

In view of the foregoing situations, there have been proposed mechanisms for automatically controlling the braking force so that the slip ratio S takes a favorable value. That is, there has been employed a method of setting a so-called simulated vehicle velocity by previously determining a vehicle velocity that is gradually reduced upon braking by way of experiment or simulation, and controlling the circumferential velocity of the wheels so as to obtain a slip ratio at a suitable value while referring to the characteristics of the simulated vehicle velocity.

However, the following problems are involved in the antiskid control device merely adapted to set an aimed wheel circumferential velocity in accordance with a simulated vehicle velocity and control the braking force to the wheels such that the actual circumferential velocity of the wheels agrees with the aimed wheel circumferential velocity.

That is, in a case where a simulated vehicle velocity with great deceleration is set and if the actual friction coefficient $\mu$ on the road surface is low, the wheel circumferential velocity is abruptly decreased to lock the wheels, by which the braking distance is increased and the wheels are liable to cause lateral slip. Further, in a case where a simulated vehicle velocity with small deceleration is set and if the actual friction coefficient $\mu$ on the road surface is high, the time for the non-braking state is unnecessarily extended to thereby increase the braking distance.

In view of the foregoing situations, the present inventors have proposed "antiskid control device" in Japanese Patent Application No. Sho 60-69285 (corresponding to U.S. Pat No. 4,671,579)

The device is adapted to measure the wheel circumferential velocities upon generation of a braking oil pressure reducing signal and upon re-pressurizing of the braking oil pressure, to determine the increase/decrease ratio for the wheel circumferential velocity, estimate the friction coefficient on the road surface based on the increase/decrease ratio, and open or close a valve for use in oil pressure control based on the estimated friction coefficient, and it has a feature capable of controlling the braking force properly in accordance with the change of the friction coefficient $\mu$ on the road surface.

That is, assuming the initial value of the vehicle velocity V as Vo, the initial value for the wheel acceleration/deceleration obtained by the differentiation of the detection data for the wheel circumferential velocity as $\dot{V}ro$ (where $\dot{V}$ is generally a negative value) and the time elapsed from a time of applying the braking force as t, the simulated vehicle velocity Vr is obtained by the calculation :

$$Vr = Vo + \dot{V}ro \times t \tag{2}$$

Further, an aimed wheel circumferential velocity Vs is obtained from the simulated vehicle velocity Vr and the slip ratio S (generally 0.1–0.3) according to the calculation :

$$Vs = Vr \times (1 - S) \tag{3}$$

and control is so performed that the circumferential velocity for each of the wheels coincides with the aimed circumferential velocity Vs of the wheels.

However, there have been found the following two disadvantages in the device described above :

The first disadvantage is that, since the friction coefficient $\mu$ on the road surface is set to each of the wheels, it is difficult to minimize the braking distance in a case where the wheels are respectively brought into contact with road surfaces of different friction coefficients $\mu$. The second disadvantage is that the antiskid effect is exerted excessively under the effect of torsional moment acting on the wheel system upon braking operation on a road surface with high friction coefficient $\mu$ to thereby cause the undesirable phenomenon of increasing the braking distance.

SUMMARY OF THE INVENTION

This invention has been proposed in view of the foregoing situations and the first object of this invention is to provide a control device capable of decelerating a vehicle body within a shortest distance by conducting an effective antiskid control in a case where the different friction coefficients on the road surface are detected for each of the wheels.

The second object of this invention is to perform an adequate antiskid control while eliminating the effect of the torsional torque generated in the axle system and acted on the antiskid operation upon braking operation under high $\mu$ conditions such as on dry asphalt pavements.

For attaining the first object as described above, this invention provides an antiskid control device comprising a detector for measuring the circumferential velocity of a plurality of wheels, an actuator for operating the braking oil pressure to the wheels, and an electric circuit adapted to calculate the friction coefficients on the road surfaces with which a plurality of the wheels are brought into contact, respectively, to calculate the aimed wheel circumferential velocity based on the friction coefficient on the road surface, and to operate the actuator such that the aimed wheel circumferential velocity and the measured wheel circumferential velocity coincide with each other, wherein the electric circuit is so adapted as to calculate an average vehicle body deceleration based on an average value for a plurality of friction coefficients on the road surfaces, and to set aimed wheel circumferential velocities for a plurality of wheels based on the calculated vehicle body deceleration and the slip ratio for each of the plurality of wheels.

An aimed wheel circumferential velocity approximate to the actual decelerated state of the vehicle body velocity is set for each of the wheels referring to the vehicle body deceleration that is set based on the average value for the friction coefficients on the road surfaces, and the control is performed so that the aimed wheel circumferential velocity of the wheel and the actual wheel circumferential velocity coincide with each other.

In order to attain the second object as described above, this invention provides an antiskid control device comprising a detection means for detecting the wheel circumferential velocity, estimation means for estimating the road surface friction coefficient, calculation means for calculating an aimed wheel circumferential velocity based on the road surface friction coefficient estimated by the estimation means, electromagnetic valve operation means for comparing the calculated value for the aimed wheel circumferential velocity with a measured value for the wheel circumferential velocity and outputting a signal for operating the electromagnetic valve so as to reduce the oil pressure in the oil pressure system when the actual wheel circumferential velocity goes lower than the aimed wheel circumferential velocity, and a control means for deactivating the braking oil pressure reducing operation by the electromagnetic valve for a predetermined period when said estimation means estimates the road surface friction coefficient to be higher than a predetermined value.

If the operation of the electromagnetic valve is deactivated for a predetermined period by the control means, the electromagnetic valve does not operate in the direction of reducing the braking oil pressure, even in an initial stage of the braking operation, that is, even in a case where a large torsional moment is generated to the axle system and the wheel circumferential velocity varies to decrease to a value lower than the aimed wheel circumferential velocity.

More specific explanation will be made with respect to these and other objects, as well as advantageous features of this invention, while referring to preferred embodiments shown in the appended drawings.

BRIEF DESCRIPTION OF DRAWINGS

FIG. 1 and FIG. 2 show one embodiment of the invention, in which

FIG. 3 and FIG. 4 show another embodiment of the invention, in which

FIG. 7 through FIG. 9 show another embodiment of the invention, in which

DESCRIPTION OF THE PREFERRED EMBODIMENTS

Explanation will be made with respect to the first disadvantage as described above while referring to FIG. 5.

Figure 5:
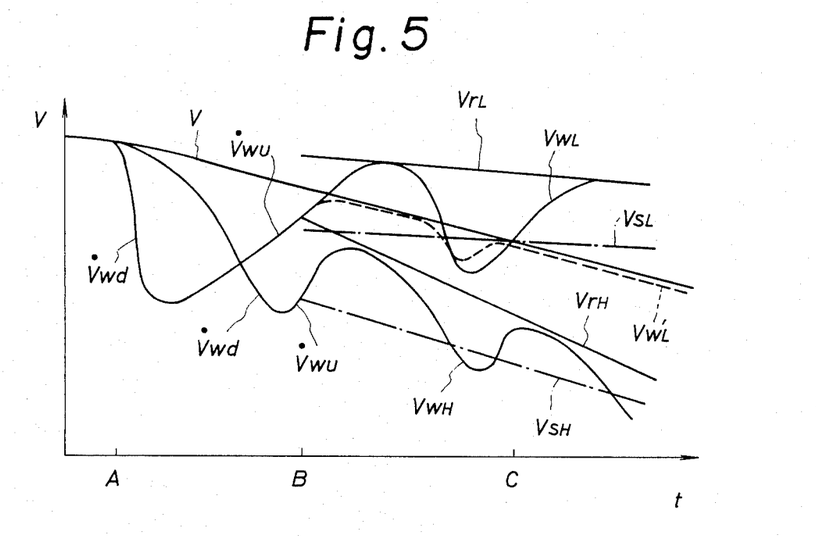
FIG. 5 is a graph illustrating, with the elapse of time, the change for each of the velocities for the antiskid control in the prior art in the same manner as in FIG. 4.

In this time chart, taking the time t on the abscissa and the velocity V on the ordinate, there are shown a vehicle velocity as V, a wheel circumferential velocity on the side of the low $\mu$ road as VwL, a wheel circumferential velocity on the side of high $\mu$ road as VwH, a simulated vehicle velocity estimated on the side of the low $\mu$ road as VrL, a simulated vehicle velocity estimated on the side of the high $\mu$ road as VrH, an aimed wheel circumferential velocity calculated on the side of the low $\mu$ road as VsL, and an aimed wheel circumferential velocity calculated on the side of the high $\mu$ road as VsH.

When a brake pedal is depressed at the point A in the drawing and the braking oil pressure reaches the maximum level, wheels begin to decelerate, and the antiskid device generates a simulated vehicle body velocity Vr approximated to the vehicle velocity and an aimed wheel circumferential velocity Vs (both not illustrated in the figure) to perform the first cycle of the antiskid operation. In the first cycle, since the simulated vehicle velocity Vr and the aimed wheel circumferential velocity Vs have to be assumed although the road surface friction coefficient $\mu$ has not yet been detected, values assuming the high $\mu$ road are set in view of the system safety.

Then, by reducing the pressure of the braking oil such that the relationship : Vs>Vw is established between the calculated aimed wheel circumferential velocity Vs and each of the measured values for the wheel circumferential velocity Vw to recover the wheel circumferential velocity Vw, the first cycle of the antiskid operation is completed.

Then, at the point B, the increase/decrease ratio $\alpha$ for the wheel acceleration/deceleration in the first cycle is defined as:

$$\alpha = \dot{V}wu/\dot{V}wd \quad (4)$$

and the $\alpha$ is calculated for each of the wheels independently to estimate the road surface friction coefficient $\mu$. That is, the coefficient $\mu$ is judged to be low if $\alpha$ is small and a simulated vehicle velocity VrL with a moderate slope (a simulated vehicle velocity of characteristic decelerated moderately) and an aimed wheel circumferential velocity VsL with the moderate slope are set in a control circuit on the low $\mu$ side.

Then, on the low $\mu$ side, the control operation is effected such that the braking oil pressure is decreased if VwL<VsL, whereas the braking oil pressure is increased if VwL>VsL so as to bring the wheel circumferential velocity VwL closer to the aimed wheel circumferential velocity VsL.

While on the other hand, on the high $\mu$ side, a simulated vehicle velocity VrH with an abrupt slope (a simulated vehicle velocity of characteristics decelerated abruptly) and an aimed wheel circumferential velocity VsH with the abrupt slope are set, and the control is effected such that the wheel circumferential velocity VwH is brought closer to the aimed wheel circumferential velocity VsH.

Accordingly, in any of the cases, the braking oil pressure is controlled under the conditions of: decreasing the braking oil pressure if Vw<Vs increasing the braking oil pressure if Vw>Vs respectively.

By the way, since the actual velocity V of the vehicle body is decelerated due to the total sum of the braking force on the high $\mu$ side and the braking force on the low $\mu$ side, there is such a trend that the aimed wheel circumferential velocity VsH on the high $\mu$ side takes an excessively lower value relative to the vehicle velocity V, whereas the aimed wheel circumferential velocity VsL on the low $\mu$ side is excessively high relative to the vehicle velocity V. Accordingly, after the time C, the aimed wheel circumferential velocity VsL on the low $\mu$ side exceeds the vehicle velocity V as VsL>V and, if the braking oil pressure is controlled based on the aimed wheel circumferential velocity VsL thus set to a higher level as a reference, the wheels on the high $\mu$ side tend to be locked inevitably.

While on the other hand, although the wheel circumferential velocity VwL on the low $\mu$ side is controlled so as to approach the aimed wheel circumferential velocity VsL, since the actual wheel circumferential velocity Vw does not exceed the vehicle velocity V, the wheel circumferential velocity VwL shows the response Vw'L as shown by the broken line in the figure, which tends to result in a substantially non-braking state, and there is a problem of failing to obtain suitable control for the braking oil pressure in both of the high and low $\mu$ sides.

This invention has been made for improving the foregoing disadvantages and explanation will now be made in more detail as to the preferred embodiment thereof.

Figure 1:
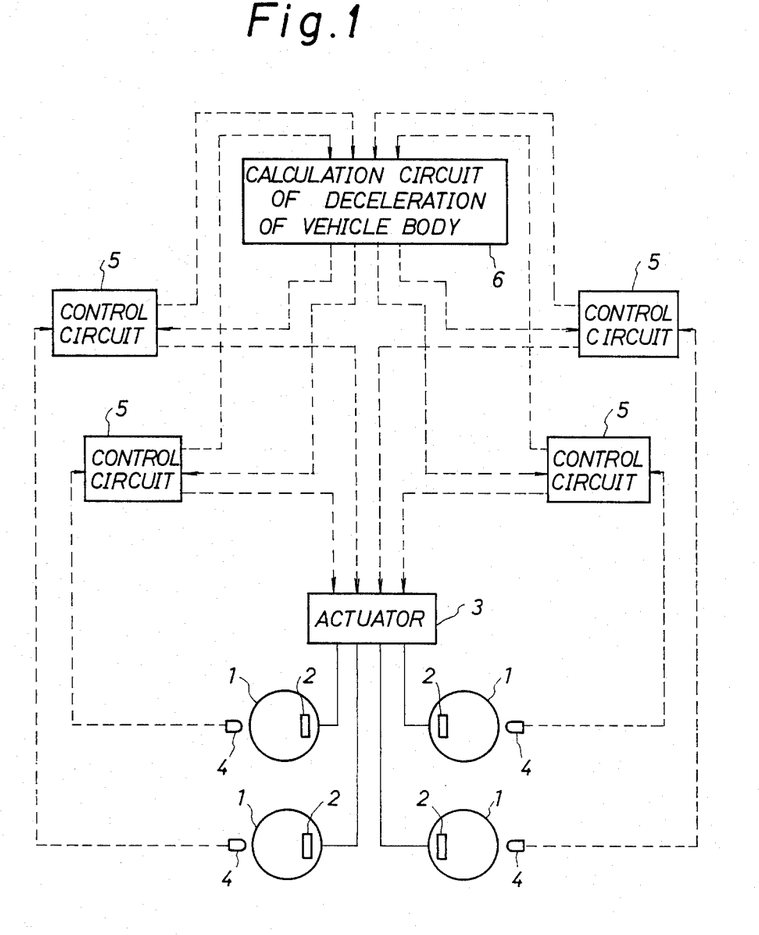
FIG. 1 is a block diagram for a braking oil pressure system and an electric circuit for controlling the system.

FIG. 1 is a block diagram illustrating one embodiment of a control system. In the block diagram, solid lines indicate the connection for oil pressure pipe-line systems, while dotted lines indicate the connection for electric signal systems.

Wheels 1 are braked respectively by operating brake calipers 2 through an oil pressure control actuator 3. Further, the circumferential velocity Vw for each of the wheels is measured by each of circumferential velocity sensors 4.

The circumferential velocity sensor 4 is adapted to detect magnetic or optical pulses generated in interlocking relation to the rotation of the wheel and a velocity detection signal from the sensor is inputted to each of the control circuits 5. Further, each of the control circuits 5 is connected to a vehicle body deceleration calculation circuit 6 and, at the same time, connected to the actuator 3 for controlling the braking oil pressure so as to supply operation signals to them.

Then, referring to the operation of the control mechanism having the foregoing constitution, the velocity of the wheel 1 is changed due to the difference between the braking torque from the brake caliper 2 and the torque given from the road surface, and the absolute value of the rotational velocity of the wheel is detected by the circumferential velocity sensor 4 and inputted as a circumferential velocity pulse signal to the control circuit 5.

The control circuit 5 counts the pulse signals from the circumferential velocity sensor 4 respectively to convert them into the wheel circumferential velocity Vw for each of the wheels 1, calculates the aimed wheel circumferential velocity Vs in accordance with a calculation equation previously stored therein, and outputs actuator control signals so as to approach the circumferential velocity Vw to the aimed wheel circumferential velocity Vs. The actuator control signals are supplied to the actuator 3, to operate the actuator 3 respectively, by which the oil pressure for the brake caliper 2 is controlled, and thus the antiskid operation is performed.

That is, on every one cycle of the antiskid operation (increase/decrease in the braking pressure) effected by the control for the braking oil pressure, control circuit 5 for each of the wheels calculates the increase/decrease ratio $\alpha$ for the wheel circumferential acceleration and deceleration, and the road surface friction coefficients $\mu$ with a constant correlationship to the increase/decrease ratio $\alpha$ are determined respectively in the control circuit 5.

Then, the wheel control circuit 5 outputs an estimated road surface friction coefficient $\mu$ to a vehicle velocity deceleration calculation circuit 6, and the vehicle deceleration calculation circuit 6 processes the input signals and outputs them as a vehicle body deceleration signal to each of the wheel control circuits 5. Then, each of the wheel control circuits 5 integrates the vehicle body deceleration signal to generate a signal for the simulated vehicle velocity Vr and, at the same time, calculates the aimed wheel circumferential velocity Vs based on the simulated vehicle velocity Vr and the slip ratio S according to the formula (3) and generates an output signal. Then, each of the control circuits 5 controls the actuator so as to repeat the antiskid operation as described above for approaching the wheel circumferential velocity Vw to the aimed circumferential velocity Vs.

In the first antiskid cycle just after the brake pedal has been depressed, since there are no velocity data to be processed and the frictional coefficient $\mu$ cannot be calculated, an initial value Vro for the simulated vehicle velocity and an aimed wheel circumferential velocity Vso corresponding to high friction coefficient $\mu$ are set as the initial $\mu$ value.

Explanation will now be made with respect to the content of the signal processing operations conducted between the wheel control circuit 5 and the vehicle deceleration calculation circuit 6.

That is, the increase/decrease ratio $\alpha$ for the acceleration/deceleration is a variant defined as the ratio between the wheel circumferential acceleration $\dot{V}wd$ upon deceleration and the wheel circumferential acceleration $\dot{V}wu$ upon acceleration ($\alpha = \dot{V}wu/\dot{V}wd$) and it has a constant correlationship with respect to the road surface friction coefficient $\mu$ as shown in FIG. 2. In each of the wheel control circuits 5, road surface friction coefficients $\mu_1$ to $\mu_4$ are estimated corresponding to the measured values $\alpha_1$ to $\alpha_4$ respectively in accordance with the correlationship shown in FIG. 2, and an average friction coefficient $\mu$ for the road surface is determined relative to the friction coefficients $\mu_1$ to $\mu_4$ in accordance with the following formula:

$$\mu = (\mu_1 + \mu_2 + \mu_3 + \mu_4)/4 \tag{5}$$

Then, the thus calculated $\bar{\mu}$ can be applied to the calculation of the simulated vehicle velocity as a value approximately equal to the vehicle deceleration $\dot{V}$ standardized to the acceleration of gravity of unit.

The thus calculated vehicle deceleration $\dot{V}$ is again sent to the control circuit 5 for each of the wheels and the control circuit 5 calculates the simulated vehicle velocity Vr based on the vehicle deceleration $\dot{V}$ as described above.

That is, when a time point at which the differentiated value $\dot{V}w$ for the wheel circumferential velocity calculated by the differentiator in the control circuit coincides with the vehicle deceleration as described above is taken as an original point and the wheel circumferential velocity and the time at the time point as Vwo and t0 respectively, the simulated vehicle velocity Vr in the present time t is calculated in accordance with the following formula:

$$Vr = Vwo - \dot{V}(t - t_0) \tag{2'}$$

Further, the aimed wheel circumferential velocity Vs is given by the formula:

$$Vs = Vr(1 - S) \tag{3'}$$

Then, a control signal is supplied to the actuator 3 so as to make the wheel circumferential velocity Vw equal to the aimed wheel circumferential velocity Vs, by which the braking oil pressure is controlled.

The value for S in the formula (3') may be a constant value, for example, within a range of 0.1 to 0.3, but it is preferred to vary the setting for the value in accordance with the detected coefficient $\mu$ such that the value is greater for high value of the detected $\mu$ and smaller for low value of the detected $\mu$, because locking occurs more readily in the case of the road surface with low friction coefficient $\mu$. According to the experiment, favorable braking effect and antiskid effect can be obtained in the case of setting S = 0.1 ~ 0.15 for low $\mu$ and S = 0.15 ~ 0.25 for high $\mu$.

Figure 3:
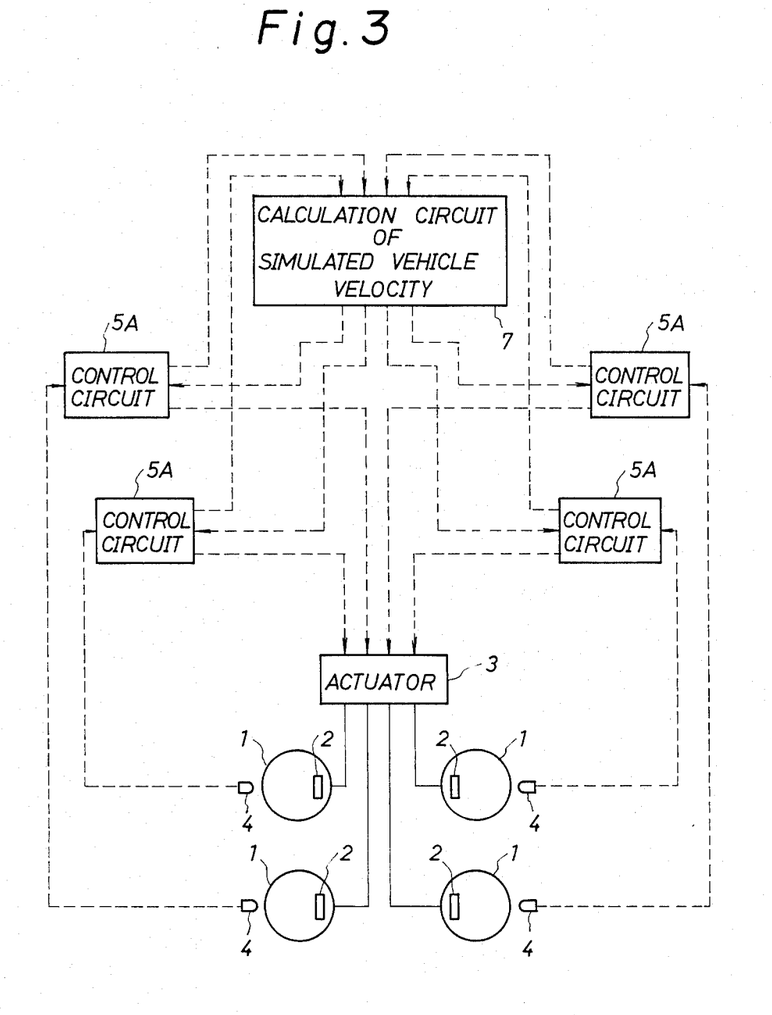
FIG. 3 is a block diagram for a braking oil pressure system and an electric circuit for controlling the system.

FIG. 3 shows another embodiment of the invention and the control device of this embodiment comprises a simulated vehicle velocity calculation circuit 7 instead of the vehicle deceleration calculation circuit 6 in the previous embodiment.

That is, in this specific embodiment, signals of wheel circumferential velocity Vw at each time and each of road surface friction coefficients $\mu_1$ to $\mu_4$ upon completion of the antiskid control for one cycle are supplied from each of the wheel control circuits 5A to the simulated vehicle velocity calculation circuit 7, the simulation vehicle velocity calculation circuit 7 applies an averaging processing to the thus inputted road surface friction coefficients $\mu_1$ to $\mu_4$ in accordance with the formula (5) in the same manner as in the previous embodiment to determine an average friction coefficient $\bar{\mu}$ and conducts the calculation for the simulated vehicle velocity for each of the wheels, which has been conducted in each of the wheel control circuits 5 in the previous embodiment, by using the standardized value for the $\bar{\mu}$ as the slope $\dot{V}r$ for the simulated vehicle velocity, that is,:

$$Vr = Vwo - \dot{V}r(t - t_0) \tag{2''}$$

and, further, selects the greatest one of the absolute values from the simulated vehicle velocity Vr determined for each of the wheels and outputs it to each of the wheel control circuits 5A.

Then, each of the wheel control circuits 5A conducts the calculation of the formula (3') respectively based on the slip ratio S corresponding to the coefficients $\mu$ estimated respectively and independently and the simulated vehicle velocity obtained by the formula (2''), to determine the aimed wheel circumferential velocity Vs for each of the wheels and conducts the antiskid control while increasing/decreasing the braking oil pressure so as to approach the measured value for the wheel circumferential velocity Vw to the aimed wheel circumferential velocity Vs.

Figure 4:
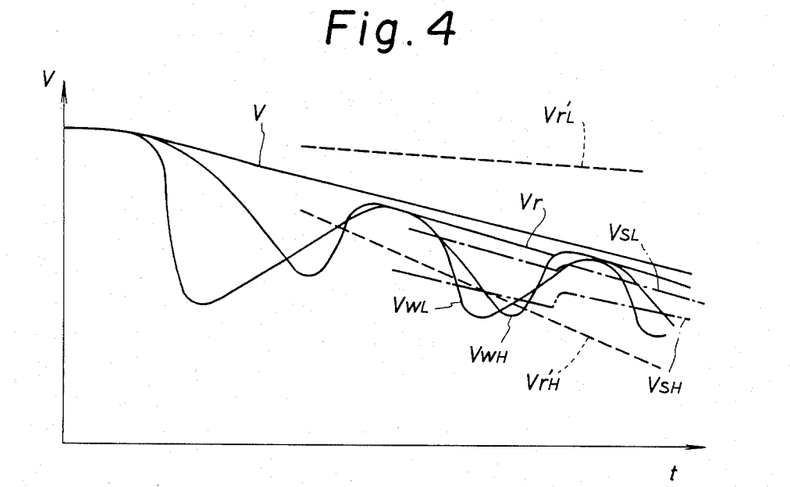
FIG. 4 is a graph illustrating, with the elapse of time, the changes in each of the velocities related to the antiskid control such as vehicle velocity, aimed wheel circumferential velocity and the actual wheel circumferential velocity for each of the wheels upon antiskid operation.

In this embodiment, control as shown in FIG. 4 is conducted in a case where wheels on right and left sides of the vehicle body are in contact with the road surfaces of different friction coefficients $\mu$.

Namely, a simulated vehicle velocity Vr approximated to an actual vehicle velocity V is set instead of the simulated vehicle velocity Vr'L and VrH set so far in the conventional control, and the VwL and VwH are controlled with the simulated vehicle velocity as a reference, whereby a satisfactory antiskid operation can be conducted.

(a) The control device according to this invention can be realized not only by the electronic circuit having the calculating function as in the embodiments described above but also by a microcomputer for carrying out the same processing in a digital manner.

(b) In the embodiments described above, a so-called 4 channel - 4 sensor system has been employed for controlling each of the wheels respectively by disposing wheel circumferential velocity sensors to each of them, however, either of 2 channel - 4 sensor system and 2 channel - 2 sensor system may be employed in a so-called X pipe-line system in which control is conducted on every pair of wheels situated on a diagonal line. In the case of 2 channel - 2 sensor system, an average value for the friction coefficients obtained from the detection values of two circumferential velocity sensors respectively may be utilized. Further, also in the case of 3 channel - 4 sensor system (for instance, a system of utilizing oil pressure systems independently on right and left sides only for driven wheels), an average value may be determined and utilized for the road surface friction coefficients in the same manner as in each of the foregoing embodiments.

(c) The method of estimating the friction coefficient $\mu$ on the road surface is not only restricted to that of using wheel circumferential velocity increase/decrease ratio $\alpha$, but it may be a system for conducting control by determining the friction coefficient $\mu$ while estimating it to be low in a case where the decreasing period for the braking oil pressure is long, whereas to be high in a case where it is short.

Explanation will now be made with respect to other embodiments while referring to FIGS. 7 through 10.

Figure 7:
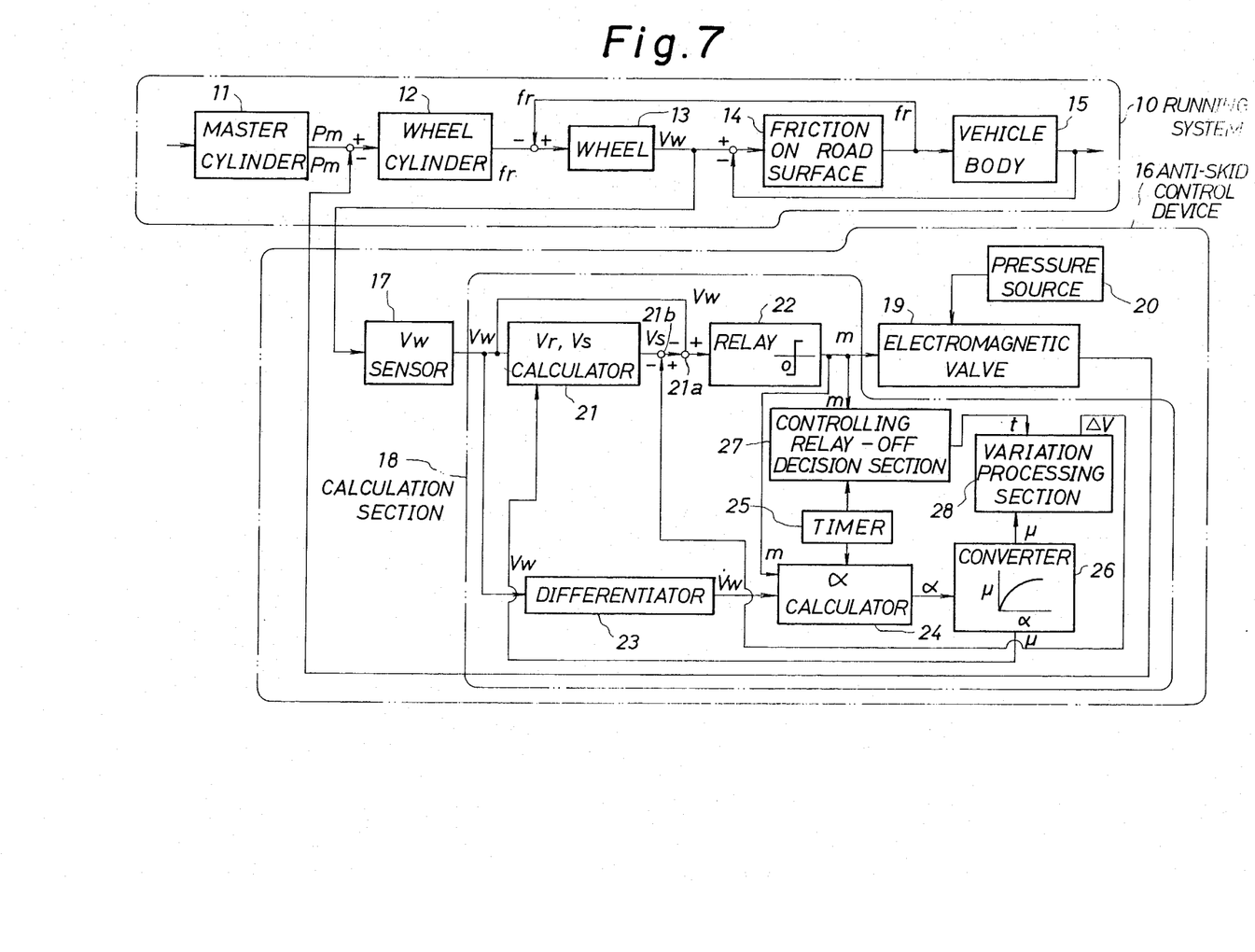
FIG. 7 is a block diagram for the control system.

In a running system 10 of a vehicle body under braking shown in FIG. 7, oil pressure is generated in a master cylinder 11 by the depressing force applied to a brake and the oil pressure generates a braking force fb from a wheel cylinder 12 to a wheel 13. Then, the difference between the friction force fr from a road surface 14 and the braking force fb is exerted as a braking force on the wheel 13 to change the wheel circumferential velocity Vw. Then, the slip ratio S is determined based on the relationship between the thus defined wheel circumferential velocity Vw and the vehicle velocity V, and then the friction coefficient $\mu$ corresponding to the slip ratio S is determined. Further, road surface friction force fr between the road surface and the wheel is defined by the friction coefficient $\mu$.

Explanation will now be made with respect to the antiskid control device shown by the dotted line 16 in FIG. 7.

A wheel circumferential velocity sensor 17 is disposed adjacent to the wheel 13 and the circumferential velocity sensor 17 measures the number of rotations of the wheel 13 by counting electromagnetic or optical pulses generated corresponding to the rotation of the wheel and calculates the circumferential velocity Vw of the wheel 13 based on the number of rotations. Further, the output from the circumferential velocity sensor 17 is inputted to a calculation section shown by the chained line 18 in FIG. 7, subjected to a predetermined processing in the calculation section 18 and converted into a control signal for controlling an electromagnetic valve 19, to thereby control the oil pressure P in the pipe-line system extended from an oil pressure source 20 comprising a pump, accumulator, pressure control valve, etc. to the wheel cylinder 12 by the electromagnetic valve 19. That is, the control is conducted by adjusting the oil pressure P applied to the wheel cylinder 12 so as to vary the braking force to coincide the wheel circumferential velocity Vw with the aimed wheel circumferential velocity Vs.

Now, explanation will be made with respect to the detailed constitution of the calculation section 18. A calculator 21 for setting an aimed wheel circumferential velocity calculates and sets the aimed wheel circumferential velocity Vs based on the simulated vehicle velocity Vr and an optimum slip ratio S. The difference between the result of the calculation of the aimed wheel circumferential velocity Vs and the measured wheel circumferential velocity is determined at a deviation detection point 21a and, depending on the result of the comparison, a relay 22 outputs a decision signal, that is, a moderating signal m for weakening the braking force if the wheel circumferential velocity is smaller than the aimed wheel circumferential velocity (Vw<Vs), whereas it outputs a moderation release signal $\overline{m}$ for increasing the braking force if Vw>Vs, so that the electromagnetic valve 19 is put to ON-OFF operation by the decision signal m or $\overline{m}$ Further, the detection signal Vw from the wheel circumferential velocity sensor 17 is inputted to a differentiator 23, which differentiates the detected value Vw for the wheel circumferential velocity to determine a wheel circumferential acceleration/deceleration $\dot{V}w$ and inputs the result of the calculation into an $\alpha$-calculator 24.

The $\alpha$-calculator 24 stores the acceleration/deceleration $\dot{V}w$ as a decreasing rate (deceleration) $\dot{V}wd$ for the wheel circumferential velocity in a case where the moderation signal m is outputted from the relay 22, whereas it reads the acceleration/deceleration $\dot{V}w$ as the increasing rate (acceleration) $\dot{V}wu$ for the wheel circumferential velocity if the moderation release signal $\overline{m}$ is outputted, and calculates the value $\alpha$ based on these values in accordance with the following formula:

$$\alpha = |\dot{V}wu/\dot{V}wd| \qquad (4')$$

Then, clock data are inputted from a timer 25 to the $\alpha$-calculator 24 and the output from the $\alpha$-calculator 24 is inputted to a converter 26. In the converter 26, the friction coefficient $\mu$ corresponding to $\alpha$ inputted from the $\alpha$-calculator 24 is estimated. The correlationship between $\alpha$ and $\mu$ is estimated using the data previously determined by means of experiment, simulation or the like. Then, the output from the converter 26 is fed back to the aimed circumferential velocity calculator 21 and the aimed circumferential velocity calculator 21 adequately modifies the simulated vehicle velocity Vr and the aimed wheel circumferential velocity Vs in accordance with the inputted value $\mu$.

On the one hand, the output signal from the timer 25 is inputted to a controlling relay-off decision section 27 and the decision section 27 stores a signal t indicating the time at which the moderating signal m is inputted and outputs the signal t to a variation processing section 28. Further, the variation processing section 28 judges whether the processing should be conducted or not based on the $\mu$ data estimated in the converter 26 on the condition that the signal for the time t has been outputted and, depending on the result of the judgment, supplies a correction signal to the deviation detection point 21b so as to decrease the absolute value for the aimed wheel circumferential velocity Vs outputted from the calculator 21 by $\Delta V$ for a time $\Delta T$.

Explanation will now be made with respect to the processing in the calculation section of the preferred embodiment while referring to FIG. 8 and FIG. 9.

In step $S_0$, processing is started by the operation of the brake.

In step $S_1$, initial values $\dot{V}ro$ and Sro for the simulated vehicle deceleration and the slip ratio are respectively set. These values are set as the optimum values in the case of high μ road surface (for example, $\dot{V}ro = -1G$, $(Sro=0.25)$ for the safety.

In step $S_2$, the wheel circumferential velocity Vw is measured and differentiated to calculate the deceleration Vw.

In step $S_3$: it is judged whether the wheel circumferential deceleration V̇w is greater than the set deceleration V̇ro or not (if $|\dot{V}w| > |\dot{V}ro|$ or not) and if the deceleration is greater than a predetermined value, occurrence of slip is judged and the processing is advanced to the next step ($S_4$) for executing the antiskid control 2. If the judgment is "NO", the processing is returned to the step $S_2$ and the judgment is repeated.

In step $S_4$, initial value Vo for the simulated vehicle velocity and the time To at which the affirmative judgment has been done in the step $S_3$ are set as initial values.

In step $S_5$, the aimed wheel circumferential velocity Vs at the time t is calculated by using the simulated vehicle deceleration V̇ro and the slip ratio Sro set in the step $S_1$, and the initial value Vo for the simulated vehicle velocity set in the step $S_4$ in accordance with the following formula (3″):

$$Vs = \{Vo + \dot{V}ro(t-t_0)\}(1-Sro) \quad (3'')$$

where the simulated vehicle velocity Vr is determined by the equation:

$$Vr = Vo + \dot{V}ro(t-t_0)$$

that constitutes a portion of the formula (3″) above.

In step $S_6$, the wheel circumferential velocity Vw is newly measured.

In step $S_7$, it is judged whether the measured wheel circumferential velocity Vw is lower than the aimed value Vs or not (Vw<Vs) and the processing is advanced to the next step $S_8$ on the condition of "YES". If the judgment is "NO", the processing is returned to the step $S_5$ and the steps $S_5$ to $S_7$ are repeated.

In step $S_8$, the relay 22 is actuated to open the electromagnetic valve 19 to thereby decrease the braking oil pressure P ($T_1$) since the judgment of "YES" means excess deceleration.

In step $S_9$, the wheel circumferential deceleration at time $T_1$ is calculated and stored as the decreasing rate of the wheel circumferential velocity V̇wd.

In step $S_{10}$, the aimed wheel circumferential velocity Vs is calculated again according to the formula (3″).

In step $S_{11}$, the wheel circumferential velocity Vw is measured again.

In step $S_{12}$, it is judged whether the measured wheel circumferential velocity Vw is greater than the aimed wheel circumferential velocity Vs or not (Vw>Vs), and the processing is advanced to the next step $S_{13}$ on the condition of "YES". In the case of judgment of "NO", the processing is returned to the step $S_{10}$.

In step $S_{13}$, the electromagnetic valve 19 is closed to increase the braking oil pressure P ($T_2$).

In step $S_{14}$, the wheel circumferential acceleration at the time $T_2$ is calculated and stored as the increasing rate of the wheel circumferential velocity V̇wu.

In step $S_{15}$, α is calculated according to the formula (4').

In step $S_{16}$, μ is determined from the thus obtained α.

In step $S_{17}$, it is judged if μ determined in the step $S_{16}$ is greater than the setting value or not (in this embodiment, $\mu = 0.3$ is set as a boundary and the higher value than the boundary is judged to be high μ and the lower value than the boundary is judged to be low μ). If the judgment is "YES" (high μ), the processing is advanced to the step $S_{18}$, whereas if the judgment is "NO", the processing is advanced to the step $S_{21}$.

Figure 8:
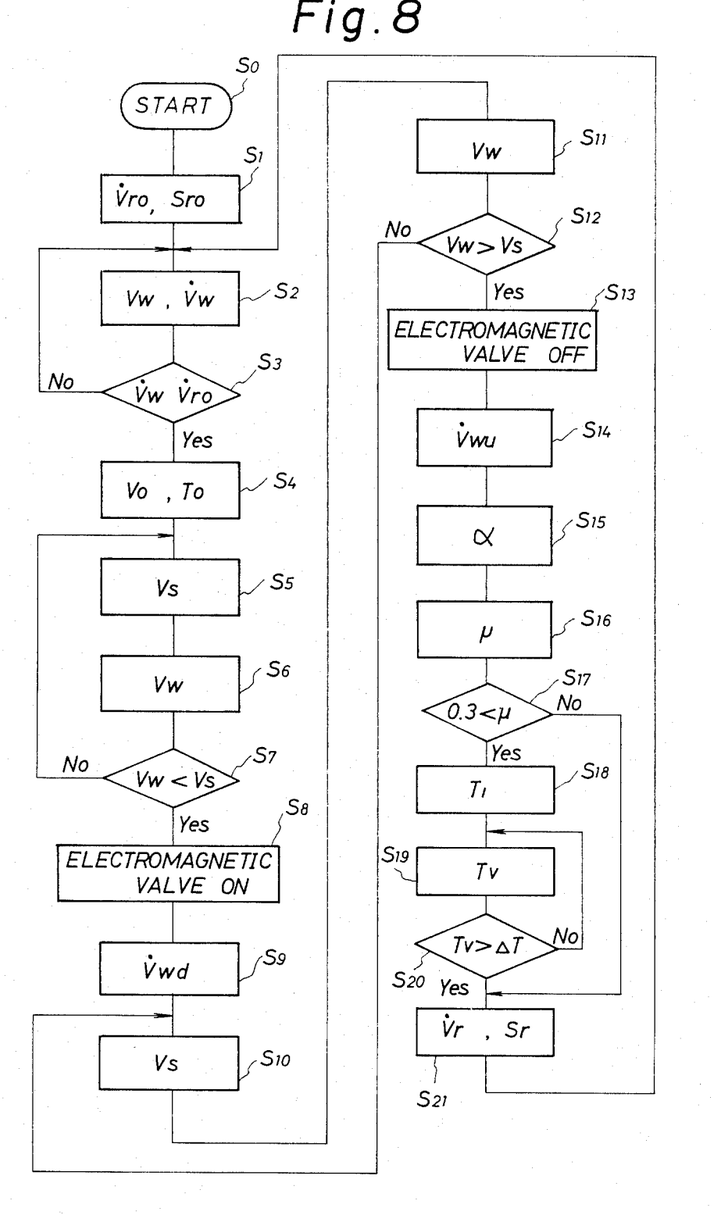
FIG. 8 is a block diagram illustrating the operation of the control device.
Figure 9:
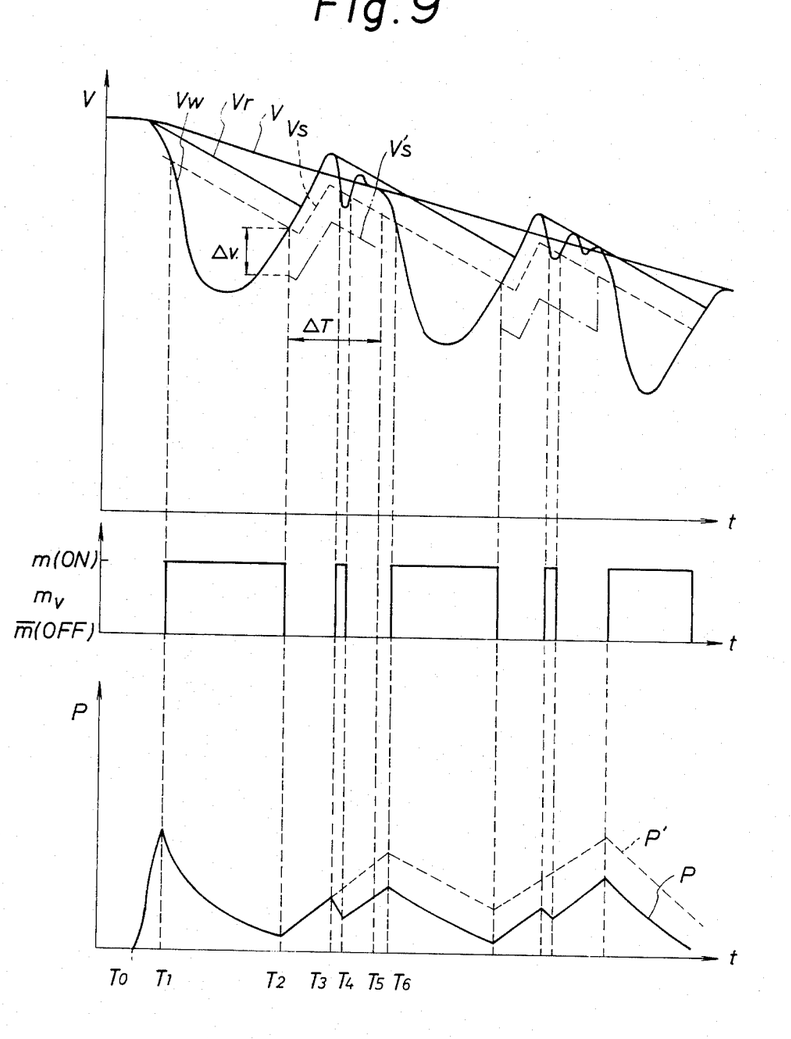
FIG. 9 is a timing chart illustrating the change for each of the velocities in the antiskid control.

In step $S_{18}$, a corrected value ΔVs for the aimed wheel circumferential velocity is supplied from the variation processing section 28 to the deviation detection point 21b, to uniformly decrease the values for the aimed wheel circumferential velocity Vs supplied to the relay 22 by ΔV (parallel movement downwardly from Vs shown by the broken line to Vs' shown by the chained line in FIG. 9). Further, the time at which Vs is decreased by ΔV, that is, the time $T_2$ at which μ is measured, is stored.

In step $S_{19}$, time Tv is calculated as the difference between the stored time $T_2$ and the present time t.

In step $S_{20}$, it is judged whether Tv is greater than the setting value, that is, if the relationship: $Tv > \Delta T$ is established or not, and, if the judgment is "YES", the processing is advanced to the step $S_{21}$ ($T_5$) If the judgment is "NO", the processing is returned to the step $S_{19}$.

In step $S_{21}$, after modifying the aimed slip ratio Sr while corresponding to V̇r, the processing is returned to the step $S_2$ and the control is repeated. In this embodiment, Vs is calculated by using the same deceleration V̇r as that in the calculation for Vs initially set and, accordingly, the slope for the aimed wheel circumferential velocity $V_s$ is identical with that in the first time. Further, after modifying the aimed wheel circumferential velocity Vs in the step $S_{21}$, when the wheel circumferential velocity Vw coincides with the aimed wheel circumferential velocity Vs, the electromagnetic valve 19 is opened to decrease the oil pressure P ($T_6$).

By the way, if the control operation is conducted in the high μ road surface, torsional vibrations may sometimes be generated in the axle system due to the fluctuations of the braking torque, etc. and the vibrations may possibly give undesired effects on the wheel circumferential velocity. The torsional vibrations particularly give remarkable effects on the wheel circumferential velocity under the condition where the levels of the absolute values for various torques exerted to the wheels are low (the condition where the slip ratio is nearly equal to zero). Then, due to the effect of the torsional vibrations as described above, although the wheel circumferential velocity Vw repeats fine increase and decrease as shown by the solid line in FIG. 9 after time $T_2$, since the aimed wheel circumferential velocity is decreased from Vs to Vs', the wheel circumferential velocity Vw does not go below the aimed wheel circumferential velocity Vs' (shown by the chained line) and, accordingly, the oil pressure is kept to be recovered continuously also after the time $T_3$ as shown by the broken line in FIG. 9, by which the wheels are properly braked. If the modification is not made to the aimed wheel circumferential velocity, it will progress such that the electromagnetic valve 19 is opened since the wheel circumferential velocity Vw goes lower than the aimed wheel circumferential velocity Vs (shown by the solid line) at $T_3$, the oil pressure is decreased in the section $T_3$-$T_4$ as shown in the solid line in the figure to once increase the wheel circumferential velocity Vw and, after the wheel circumferential velocity Vw exceeds once the aimed wheel circumferential velocity Vs at $T_4$, the electromagnetic valve 19 is closed again to increase the oil pressure and, further, after Vw goes lower than Vs at $T_6$, the electromagnetic valve 19 is opened.

The following optimum values can be obtained experimentally for the modification value ΔV (km/h) for the aimed wheel circumferential velocity and the modification time ΔT (sec).

That is, in the case of high μ road surface as μ>0.3 (for instance, dry asphalt road surface), both of them are set as:

$V = 5 - 10(kg/h)$ $T = 0.1 - 0.2(sec)$ and the modification for the aimed wheel circumferential velocity Vs is executed. While on the other hand, in the case of low μ road surface as μ<0.3 (for example, frozen road surface), since both of them are set as:

$\Delta V = 0$ $\Delta T = 0$ no modification is executed for the aimed wheel circumferential velocity.

Then, operation examples of other antiskid control applied with the invention are explained by comparison referring to FIGS. 10(a)-(d).

Figure 10:
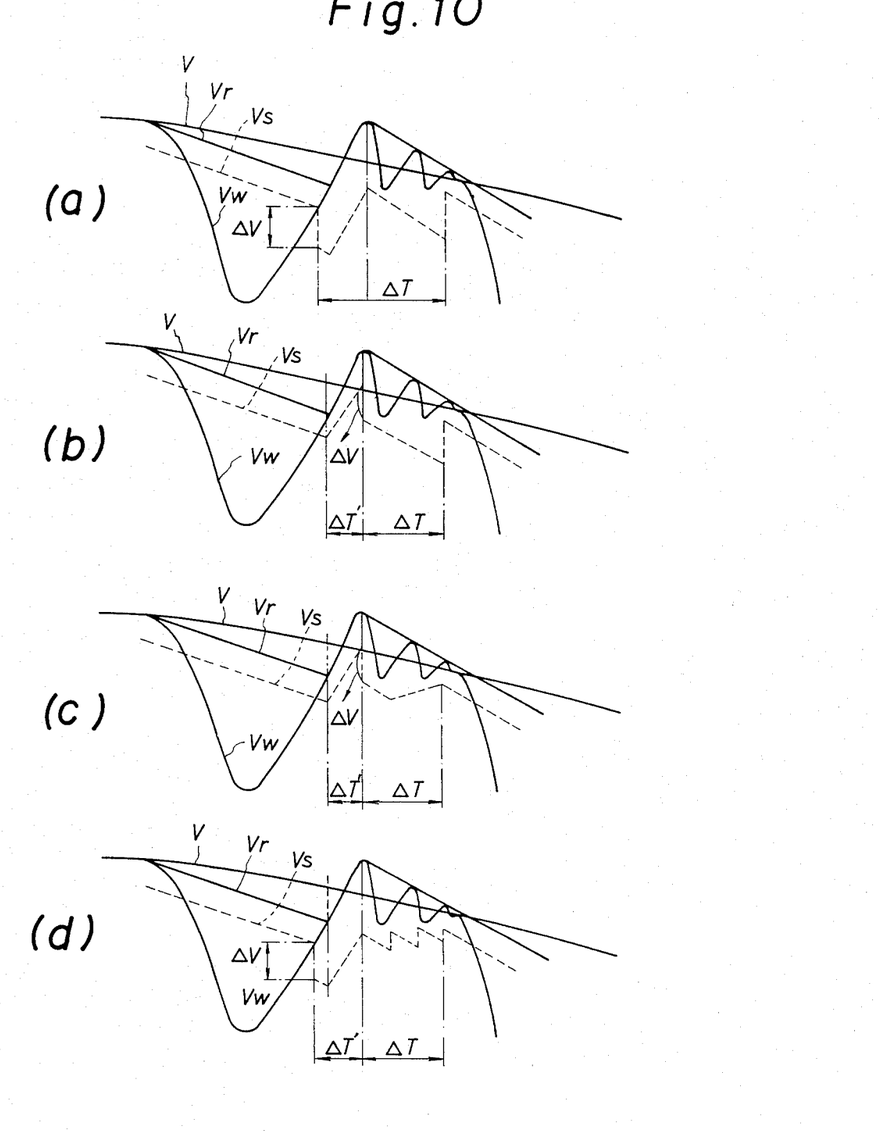
FIG. 10 shows timing charts for the antiskid control in the above-mentioned and other embodiments, respectively.

FIG. 10(a):

FIG. 10(a) is a timing chart showing the antiskid control for the embodiment as described above in the same manner as in FIG. 9, in which adjustment of the velocity ΔV is executed for ΔT.

FIG. 10 (b):

Modification of ΔVr for the aimed wheel circumferential velocity is executed for ΔT from the time at which the wheel circumferential velocity Vw has reached a peak and become lower than the simulated vehicle velocity Vr, that is, with a time delay ΔT′ from commencement time of modification in FIG. 10(a).

FIG. 10(c):

ΔV is adjusted in the course of controlling the wheel circumferential velocity over ΔT in FIG. 10 (b) in accordance with an independent function different from the slope of the simulated vehicle velocity Vr, for example, the change in the wheel circumferential velocity determined experimentally.

FIG. 10(d):

After executing the similar modification to that in FIG. 10(a) above for ΔT′, stepwise modification is conducted by repeating the modification as conducted in FIG. 10(b) above each by a short period of time.

(a) The specific constitution for the control system is not limited only to the foregoing embodiment, but similar control can also be performed by using a microcomputer for executing the processing as shown in FIG. 8 instead of the calculation section in the foregoing embodiment.

(b) Although the operation conditions for the electromagnetic valve are changed by operating the calculated value for the aimed wheel circumferential velocity in the foregoing embodiment, a method of directly operating the operation conditions for the electromagnetic valve may be employed; such method includes, for example, interrupting the driving signal to the electromagnetic valve for a predetermined time when a high μ state is estimated.

(c) Although the explanation has been made with respect to the control for one axle system in the foregoing embodiment, the control system of this invention is also applicable, for example, to a so-called 4 channel - 4 sensor system in which respective wheels of a 4-wheeled car are controlled independently in the same manner, a so-called 2 channel - 2 sensor system in which each pair of right and left wheels is controlled by an identical system, or 3 channel - 4 sensor system in which only the driving wheels are controlled independently on the right and left sides.

(d) It is not always necessary that the control according to this system is carried out for the entire step of the antiskid operation, but it may be effected only as to one to several cycles at the initial stage where great torsional torques are applied to the axle system.

As is apparent from the foregoing descriptions, according to this invention, since an average value is determined for the friction coefficients on the road surfaces calculated based on the velocity data measured for each of the wheels, the vehicle deceleration is set on the basis of the average value for the frictional coefficients on the road surfaces as a reference and the aimed wheel circumferential velocity for each of the wheels is determined based on the vehicle deceleration, an aimed wheel circumferential velocity approximate to an actual vehicle velocity is set for each of the wheels, and control is conducted so as to approach the wheel circumferential velocity to the aimed wheel circumferential velocity as a reference. Accordingly, there can be obtained an advantageous effect that, if the friction coefficients on the road surfaces in contact with respective wheels are different, the braking distance can be decreased while preventing the skid and keeping favorable steering performance.

In addition, since the antiskid device according to this invention comprises a detection means for detecting a wheel circumferential velocity, estimation means for estimating the road surface friction coefficient, calculation means for calculating the aimed wheel circumferential velocity based on the road surface friction coefficient estimated by the estimation means, electromagnetic valve operation means for comparing the calculated value for the aimed wheel circumferential velocity with the measured value for wheel circumferential velocity and outputting a signal for operating the electromagnetic valve so as to reduce the oil pressure in the oil pressure system when the wheel circumferential velocity goes lower than the aimed wheel circumferential velocity, and control means for deactivating an operation, which is effected by the electromagnetic valve to decrease the braking oil pressure, for a predetermined time in a case where said estimation means for the friction coefficient estimates a road surface coefficient greater than a predetermined value, it is possible to prevent the electromagnetic valve from operating in the direction of reducing the oil pressure in the oil pressure circuit, in a case where the braking operation is conducted on a high μ road and, accordingly, it can provide an advantageous effect capable of effectively preventing the undesired phenomenon that the antiskid effect is exerted excessively to increase the braking distance due to the effect of the torsional moment acting on the wheel system upon onset of the braking operation on the high μ road.

What is claimed is:

1. An antiskid control device comprising:
   detectors for measuring circumferential velocities of a plurality of respective wheels,
   actuator means for providing a braking oil pressure to each of said wheels, and electric circuit means for calculating frictional coefficients of road surfaces in contact with said wheels respectively based on the measured values from said detectors, for calculating aimed wheel circumferential velocities of the respective wheels based on the calculated frictional coefficients of the road surfaces, and for operating said actuator means such that respective ones of said aimed wheel circumferential velocities coincide with respective ones of the measured wheel circumferential velocities, said electric circuit means being adapted to operate said actuator means by setting individual aimed wheel circumferential velocities for each of said plurality of wheels based on a vehicle deceleration calculated from an average value for the frictional coefficients of road surfaces with which said plurality of wheels are in contact, respectively, and based on a slip ratio for each of the plurality of wheels.

2. An antiskid control device comprising:

electromagnetic valve means operatively connected to an oil pressure system for controlling braking oil pressure of the oil pressure system so as to facilitate operation of a vehicle brake operatively connected to the oil pressure system, and a control circuit for operating said electromagnetic valve means, wherein said control circuit comprises detection means for detecting a wheel circumferential velocity, estimation means for estimating a friction coefficient of a road surface based on the wheel circumferential velocity detected by said detection means, calculation means for calculating an aimed wheel circumferential velocity based on the friction coefficient of the road surface estimated by said estimation means, electromagnetic valve operation means for comparing the aimed wheel circumferential velocity calculated by said calculation means with the wheel circumferential velocity detected by said detection means, and for outputting a signal for operating said electromagnetic valve means so as to reduce the oil pressure of said oil pressure system when the wheel circumferential velocity detected by said detection means goes lower than the aimed wheel circumferential velocity calculated by said calculation means, and control means for interrupting control of the braking oil pressure of the oil pressure system by the electromagnetic valve means so as to decrease the braking oil pressure for a predetermined time in a case where said estimation means estimates the friction coefficient of the road surface to be greater than a predetermined value.

3. An antiskid control device as defined in claim 2, wherein the control means is adapted to decrease the aimed wheel circumferential velocity calculated by the calculation means.

4. An antiskid control device as defined in claim 2, wherein the control means is adapted to interrupt the signal outputted by the electromagnetic valve operation means.

5. In an antiskid control device, comprising:

valve control means responsive to a wheel circumferential velocity signal corresponding to a wheel circumferential velocity of a vehicle and to an estimated road friction signal corresponding to an estimated road friction of a road on which the vehicle is traveling for generating a valve control signal, road friction estimating means responsive to the wheel circumferential velocity signal for generating the estimated road friction signal, and valve means connected to an oil pressure system of the vehicle and responsive to the valve control signal and to the estimated road friction signal for controlling braking oil pressure of the oil pressure system so as to facilitate operation of a vehicle brake of the vehicle operatively connected to the oil pressure system;

the improvement comprising valve control modifying means responsive to the estimated road friction signal for generating a valve control modifying signal when the estimated road friction signal indicates that the estimated road friction is not equal to a predetermined value, said valve control means being responsive to said valve control modifying signal for modifying the braking oil pressure of the oil pressure system for a predetermined time.

6. In the device of claim 5, wherein said valve control means lowers the braking oil pressure of the oil pressure system when the estimated road friction is greater than the predetermined value.

7. In the device of claim 5, wherein the valve control means raises the braking oil pressure of the oil pressure system when the estimated road friction is less than the predetermined value.

8. In the device of claim 5, wherein said valve control modifying means comprises:

a timer for generating a timer signal;

a decision section responsive to the timer signal and to the valve control signal for generating a control output; and a processor section responsive to the control output from the decision section and to the estimated road friction signal from the road friction estimating means for generating said valve control modifying signal.

* * * * *